UNITED STATES PATENT OFFICE.

VICTOR G. BLOEDE, OF CATONSVILLE, MARYLAND.

PROCESS OF DYEING.

SPECIFICATION forming part of Letters Patent No. 593,192, dated November 9, 1897.

Application filed January 22, 1894. Serial No. 497,693. (No specimens.)

*To all whom it may concern:*

Be it known that I, VICTOR G. BLOEDE, a citizen of the United States, and a resident of Catonsville, in the county of Baltimore and State of Maryland, have invented certain new and useful Improvements in the Dyeing or Coloring of Fibers and Fabrics, of which the following is a specification.

My invention relates to a new and improved process for effecting the diazotization of anilin and other colors or coloring-matter requiring such treatment for the improvement or development of the color. Hitherto it has been customary to effect the diazotization of such colors or color-producing combinations by passing them through or subjecting them to the action of an aqueous bath or solution of nitrous acid, usually produced by the action of sulfuric or muriatic acid upon nitrite of soda. By this treatment considerable of the coloring-matter is washed off and wasted and the nitrous-acid bath is proportionably depleted, giving rise to more or less irregular and variable results. I overcome all of these objections and produce much more economical, rapid, and certain results by substituting for the aqueous solution of nitrous acid a treatment of the goods by or with the fumes of nitrous acid—that is to say, by placing the goods impregnated with the color or color-producing material in contact with nitrous acid in the free or gaseous state or nitrous-acid gas combined with air, steam, or both.

To carry out my process in practice, I first treat the goods to be dyed with any of the compounds requiring diazotization for their fixation or better development—for instance, the primulin or diamin series of colors, or homologous or analogous compounds, or logwood, fustic, or other vegetable dyes capable of higher development by diazotization. This preliminary treatment of the fiber or fabric consists in padding or otherwise saturating them with the solutions of the compounds to be developed or diazotized, then removing the excess of liquor, after which the development or diazotization is effected by subjecting them to the action of nitrous-acid gas alone or combined with air, steam, or other gases, instead of applying the diazotizing agent in the form of an aqueous bath or solution. After diazotization or development has been effected in this manner the goods may then be further treated in the usual manner practiced for this class of dyes—that is to say, washed, soaped, or padded in liquors effecting further modification of the colors, as may be desired.

Nitrous acid in gaseous form can be made in one of several ways—either by the addition of sulfuric acid or other mineral acid to a solution of nitrite of soda in water or by the action of nitric acid upon starch or arsenious anhydrid. The reaction and results of the latter process are represented by the following formula:

$$AS_2O_3 + 3H_2O + 2HNO_3 = 2H_3ASO_4 + 2HNO_2,$$

the latter being nitrous acid, which is eliminated from the compound in gaseous form. The substance claimed under this specification may therefore be termed either "nitrous acid" or "hydrated trioxid of nitrogen," and this substance is more specifically described because there are five other oxids of nitrogen, none of which excepting the one described being suitable for the purpose.

As a great many colors and coloring compounds can be developed or modified by diazotization, I do not confine myself to any of those above mentioned nor to the exact details laid down in the above description; but

What I claim as my invention, and desire to secure by Letters Patent, is—

1. The process herein described for development or modification of colors by diazotization, which consists in subjecting the fibers or fabrics treated with such colors or color-producing compounds to the action of nitrous acid in gaseous form, substantially as herein set forth.

2. The process herein described for the development or modification of colors by diazotization, which consists in subjecting the fibers or fabrics treated with such colors or coloring compounds to the action of nitrous acid in gaseous form combined with air, substantially as herein set forth.

VICTOR G. BLOEDE.

Witnesses:
CARL SILSON, Jr.,
RAYMOND M. GLACKEN.